(12) United States Patent  (10) Patent No.: US 8,131,638 B2
Muller  (45) Date of Patent: Mar. 6, 2012

(54) SYSTEM AND METHOD FOR ASSESSING OPERATIONAL RISK EMPLOYING MARKET-BASED INFORMATION PROCESSING

(75) Inventor: Samuel Muller, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 797 days.

(21) Appl. No.: 12/123,638

(22) Filed: May 20, 2008

(65) Prior Publication Data

US 2009/0292567 A1  Nov. 26, 2009

(51) Int. Cl.
    *G06Q 40/00* (2006.01)
(52) U.S. Cl. ......................................................... 705/38
(58) Field of Classification Search ....................... 705/38
    See application file for complete search history.

(56) References Cited

U.S. PATENT DOCUMENTS

| | | | | |
|---|---|---|---|---|
| 5,819,237 | A * | 10/1998 | Garman | 705/36 R |
| 5,970,479 | A * | 10/1999 | Shepherd | 705/37 |
| 6,876,982 | B1 * | 4/2005 | Lancaster | 705/37 |
| 7,318,038 | B2 * | 1/2008 | Labbi | 705/7.23 |
| 7,483,857 | B2 * | 1/2009 | Bansal et al. | 705/39 |
| 7,571,109 | B2 * | 8/2009 | Fawls et al. | 705/7.28 |
| 7,693,778 | B2 * | 4/2010 | Nafeh | 705/37 |
| 7,778,856 | B2 * | 8/2010 | Reynolds et al. | 705/7.28 |
| 7,840,473 | B2 * | 11/2010 | Kraehenbuehl et al. | 705/37 |
| 2003/0236736 | A1 * | 12/2003 | Harmon et al. | 705/37 |
| 2005/0251478 | A1 * | 11/2005 | Yanavi | 705/40 |
| 2006/0026005 | A1 | 2/2006 | Rogov | |
| 2006/0069635 | A1 * | 3/2006 | Ram et al. | 705/37 |
| 2009/0083176 | A1 * | 3/2009 | Sandor et al. | 705/37 |
| 2009/0292570 | A1 * | 11/2009 | Fawls et al. | 705/7 |

FOREIGN PATENT DOCUMENTS

WO  0133465 A2  10/2001

OTHER PUBLICATIONS

Ray et al.: Operational risks, bidding strategies and information policies in restructured power markets, 1999, Decision Support System (24), pp. 175-182.*
Kent et al.: Supply chain risk management, Dec. 6, 2007, Supply Chain Council (SCC), pp. 1-7.*
Cummins et al.: The market value impact of operational risk event for U.S. Banks and Insurers, Dec. 23, 2004, pp. 1-52.*
Base Committee on Banking Supervision: Consultative Document—Operational Risk, Jan. 2001, pp. 1-30.*
Sabarwal, T.: Common structures of asset-backed securities and their risks, Dec. 29, 2005, pp. 1-25.*
Eric Bonabeau; "Agent-Based Modeling: Methods and Techniques for Simulating Human Systems"; PNAS, May 14, 2002, vol. 99, suppl 3; pp. 7280-7287.

(Continued)

*Primary Examiner* — Bijendra K Shrestha
(74) *Attorney, Agent, or Firm* — Cantor Colburn LLP; Daniel Morris

(57) ABSTRACT

A method of assessing operational risk includes defining a participant set. The participant set includes a plurality of members. The method also includes identifying a set of initial risk sources, assigning risk certificates for each of the initial risk sources to each of the plurality of members of the set of participants, and trading the risk certificates among the plurality of members of the set of participants to establish market prices that correspond to a level of risk associated with each of the initial risk sources.

19 Claims, 3 Drawing Sheets

OTHER PUBLICATIONS

Dominik D. Lmabrigger; "The Quantification of Operational Risk Using Internal Data, Relevant External Data and Expert Opinions"; http://www.gloriamundi.org/picsresources/dlpsmw_gor.pdf, Apr. 13, 2007.

* cited by examiner

SYSTEM AND METHOD FOR ASSESSING OPERATIONAL RISK EMPLOYING MARKET-BASED INFORMATION PROCESSING

BACKGROUND OF THE INVENTION

1. Field of the Invention

Exemplary embodiments of the invention relate to the art of methods for assessing operational risk and, more particularly, to a system and method of assessing operational risk employing market-based information processing.

2. Description of Background

Various regulatory frameworks, such as BASEL II, require industries, in particular banking and insurance, to quantify operational risk. Identifying different risk sources and correctly modeling dependencies between separate sources of risk makes quantifying operational risk a complex task. Moreover, gathering meaningful risk-relevant data to input into mathematical risk models is very difficult and, as a starting point, is essential to quantifying operational risk.

At present, enterprises manage market risk by relying upon specific financial products that are based on prices of underlying stocks, bonds, or similar products. Financial markets relatively accurately price the underlying products. Structured products and derivatives are used to minimize or mitigate risk. Companies manage credit risk by relying upon large data sets of historic, socio-demographic, and geographic information as well as credit ratings. Companies manage actuarial risk by using large historic, socio-demographic, and geographic data sets that aid in identifying risk groups. Operational risk, on the other hand, is more difficult to assess.

Gathering reliable input data for the quantification of operational risk is difficult. Companies have individualized structures that are typically not shared with outside groups. In addition, in order for companies to remain competitive, internal structures must be adaptable to meet market changes. Moreover, most operational risk data is based on implicit information and intuition rather readily definable metrics. Finally, employees have no incentive to share risk-relevant information with fellow employees or management. The flexible nature of the internal business structures, implicit information lack of employee incentives as well as various other factors hinder companies from systematically gathering meaningful risk data and deriving meaningful risk estimates.

SUMMARY OF THE INVENTION

The shortcomings of the prior art are overcome and additional advantages are provided through the provision of a method of assessing operational risk. The method includes defining a participant set that includes a plurality of members, identifying a set of initial risk sources, assigning risk certificates for each of the initial risk sources to each of the plurality of members of the participant set, and trading the risk certificates among the plurality of members of the participant set to establish market prices that correspond to a level of risk associated with each of the initial risk sources.

System and computer program products corresponding to the above-summarized methods are also described and claimed herein.

Additional features and advantages are realized through the techniques of exemplary embodiments of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution which enables enterprises to assess risk associated with various risk sources. By openly trading risk certificates between participants having both explicit and implicit knowledge about specific risk sources, prices are set which correspond to a particular risk level, at a particular point in time, for the risk source. In this manner, the enterprise can determine with a greater level of accuracy operational risk levels that adapt to, and reflect in real time, changes in risk resulting from various internal and external fluctuations.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the exemplary embodiments of the invention, together with advantages and features, by way of example with reference to the drawings.

DETAILED DESCRIPTION OF THE INVENTION

Figure 1:
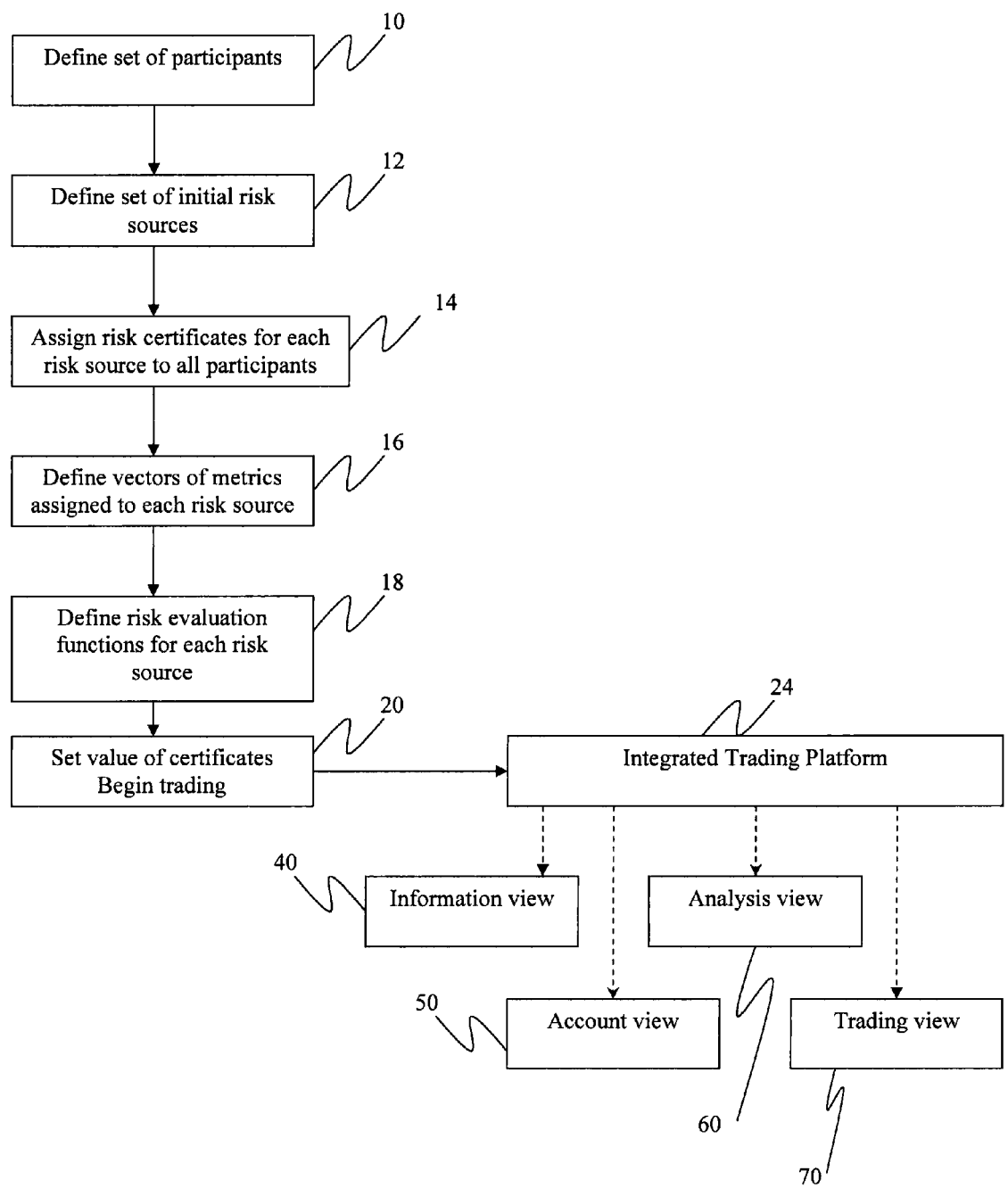
FIG. 1 is a flow chart illustrating a method of assessing operational risk in accordance with an exemplary embodiment of the invention.

With initial reference to FIG. 1, a method for assessing operational risk by market information processing is indicated generally at 2. Initially, a set of participants that includes a plurality of members is defined as indicated in block 10. Typically, the plurality of members include individuals at all levels of a company's business structure having knowledge and opinions about various systems. After defining the set of participants, initial risk sources are identified and defined as indicated in block 12. Risk sources can include, for example, mechanical/technical risk such as computer systems, server systems, applications and processes or, conceptual risk such as flawless and efficient execution of a production process, success of a new marketing campaign, or successful launch of a new product. At this point, risk certificates associated with each risk source are assigned to each of the plurality of members in the set of participants as indicated in block 14. The risk certificates are analogous to stock certificates, bonds or the like and are associated directly with each risk source. After assigning the risk certificates, vectors of metrics are assigned for each risk source as indicated in block 16. That is, metrics are defined or established for each risk source so that success and/or failure can be measured. For example, metrics may include failure rate of a particular application, customer complaints associated with a product or application, loss of value of a financial instrument, down time associated with a particular system or application, or system hang-ups, failures and the like for applications, calls to a help desk, etc or the like.

After defining metrics associated with each source, risk valuation functions are defined for each risk source as indicated in block 18. That is, the functional dependency between defined metrics and payoff received at the end of a period is defined for each metric. For example, in the case of a product, the number of complaints received on the product can be multiplied by a predefined factor in order to quantify risk level. That is if "n" equals the number of complaints, the end-of-period payoff "m" can be determined as follows: m=max {0,1−0.02*n}. Once valuation functions are established/defined, an initial value/price is established for each certificate and trading begins as indicated in block 20. An initial price for each certificate can be defined/established using various models, for example, management many employ a Delphi or Oracle method where a committee sets a price for each certificate for each risk source, random prices or values can be assigned to each certificate or a fixed price can be determined for each certificate.

Trading certificates can be carried out through direct negotiation between two or more participants or, through an integrated trading platform as indicated in block 24. The integrated trading platform includes an information view such as indicated at block 40, an account view such as indicated at block 50, an analysis view such as indicated at block 60 and a trading view such as indicated at block 70.

The information view displays information about each identified risk source as stored in a risk source database. The information may include metrics used to calculate the risk of a given risk source, the owner of a given risk source and/or the number and price of certificates issued per risk source. The information view also contains reports about individual systems (as obtained from dynamically integrated external news feeds, central reporting databases, internet, chat, etc.). Reports include regular reports as published by the owners of a risk source, independent commentaries, forum-like discussions, investments "tips/rumors", as well as buy and sell recommendations. Reports may also include blogs that provide information about a particular risk source, owner or the like. In addition to existing risk sources, additional risk sources can be suggested for consideration by any or all of the participants. The suggested new risk source is presented to a responsible risk officer via different channels such as, inter-office mail, email, messaging, personal communication, a built-in messaging facility, a web-based forum and the like.

The account view displays the available "money" for buying new certificates and lists all certificates owned by the participant. Each certificate is identified by name and type as obtained from a central certificate database, as well as additional information obtained from, for example, the central certificate database, news feeds, relevant forum entries about specific risk source associated with the certificate, reports and the like. The personal account view also provides the participant with a total number of certificates owned, as well as the market value of each certificate. The market value for each certificate can be broken down per certificate, per certificate type, total value of all certificates, etc. In addition, the participant is presented with historic transaction information for each certificate currently owned (i.e. market price at which the certificate was bought, market partner from which the certificate was bought, etc.). Previously owned information such as the market partner to which the certificate was sold, price at which it was sold, etc. The account view further provides necessary functionality to add "money" to be used for buying new certificates and to withdraw money earned from selling previously owned certificates or from cashing in owned certificates at the end of some predefined period. At this point, it should be understood that the term "money" should be construed to include not only legal tender but various objects that function as a medium of exchange or objects having an intrinsic value, for example, vacation credits, bonus credits, gift certificates and the like.

The analysis view provides access to the current and historic market prices of all certificates traded in the market. In a typical implementation, data can be displayed in a variety of configurations such as, tables, time series, charts and the like. The analysis view may provide sophisticated statistical analysis tools such as regression analysis, variance analysis, time series analysis and the like to better understand historic market price movements and to support market price predictions. In addition, import and export features allow data export to external tools to facilitate data analysis.

Figure 2:
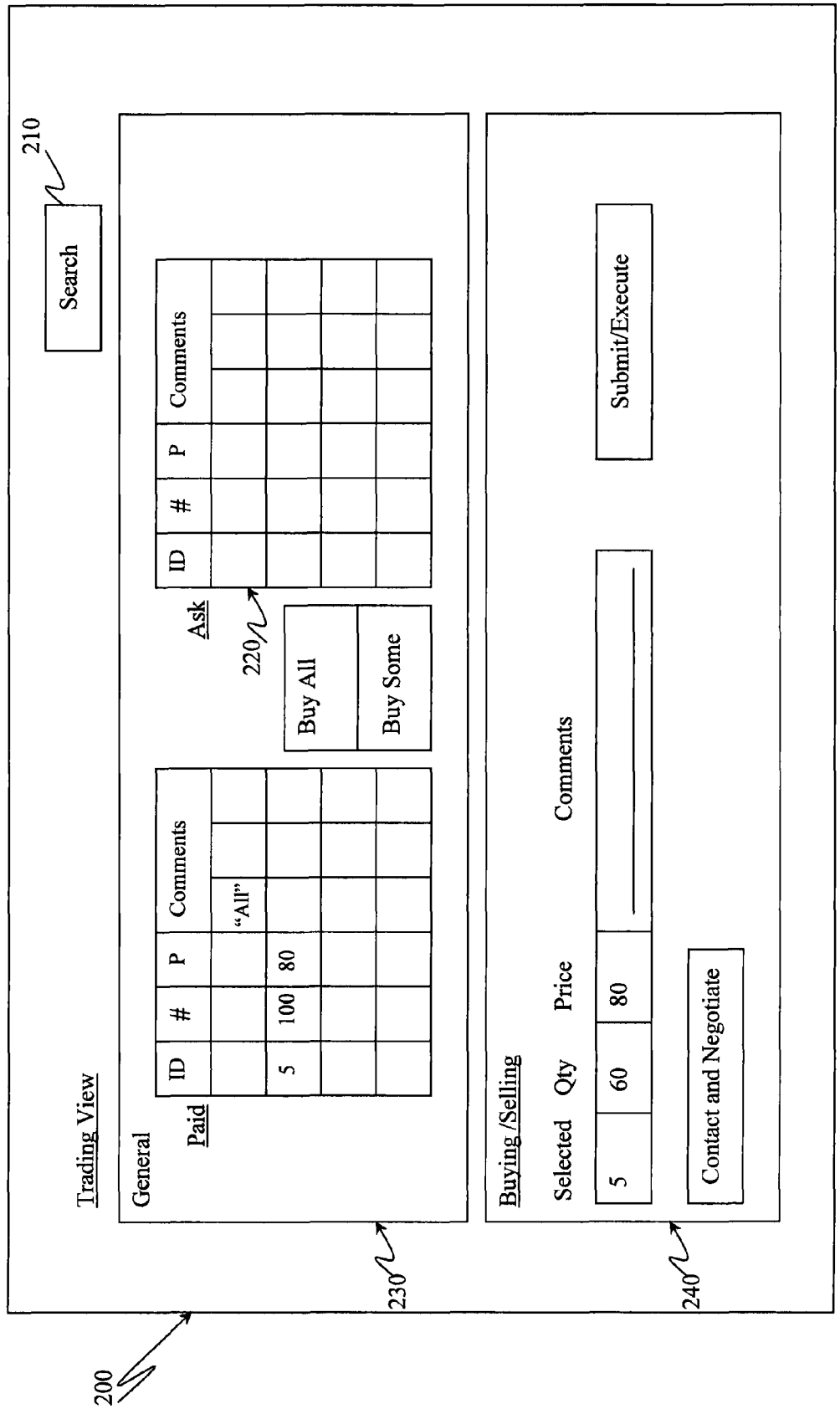
FIG. 2 is a schematic diagram of a trading view screen in accordance with an exemplary embodiment of the invention.

The trading view, such as illustrated in FIG. 2 at 200, allows for buying and selling certificates. Typically, the trading view offers an online view on the current market price and offered volume (bid-ask spread) of each certificate offered as well as a dedicated search and filter function 210 to facilitate an efficient and timely execution of desired transactions. For example, a participant wishing to purchase certificates may post a buying interest to an ask-table 220 including the identification of a risk source of interest, number of certificates desired, and price per certificate the participant is willing to pay. Conversely, a participant wishing to sell certificates may post selling an interest to a bid-table 230 including the identification of the risk source associated with the certificates offered for sale, the number of certificates offered for sale and the price desired for a certificate. The trading view enables searching and browsing the bid-table and ask-table to select desired certificates at the offered price or at a feasible price. In addition, the trading view offers a negotiation feature 240 where employees whose bid and ask price spreads do not match can enter into (possibly anonymous) price negotiations through chat, mail, or audio discussions.

The risk and assessment method described above enables an enterprise to determine operational risk for various risk sources. That is, low certificate price would imply a high operational risk associated with a particular risk source while a high certificate price could imply a low operational risk associated with a particular risk source. Based on this information, the enterprise can then inspect systems, processes or products identified by a low certificate price and take measures to mitigate the perceived risk, or feed the information into a more complex quantitative analysis model. In addition, employees can also suggest risk sources and metrics to be taken into account to make sure that aspects that were seemingly irrelevant at the time of defining the specific risk evaluation metrics can still be incorporated at a later stage in the process. Market-relevant data can be published internally and made accessible to all participants through audits, reports, etc. in order to provide more information to the participant to assess risk.

Figure 3:
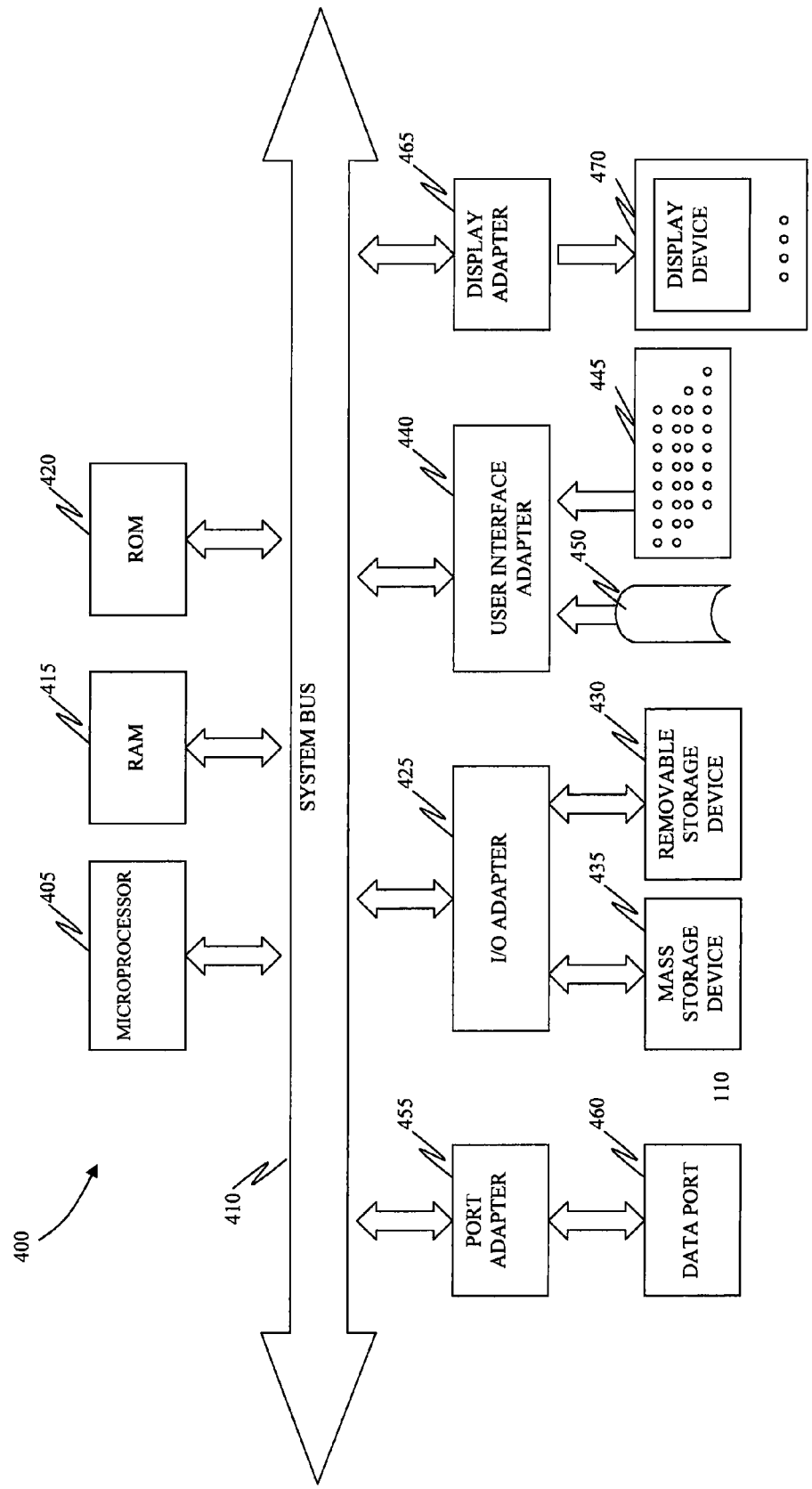
FIG. 3 is a block diagram of a general-purpose computer suitable for practicing the present invention exemplary embodiments.

Generally, the method of assessing operations risk described herein is practiced with a general-purpose computer and the method may be coded as a set of instructions on removable or hard media for use by the general-purpose computer. FIG. 3 is a schematic block diagram of a general-purpose computer suitable for practicing the present invention embodiments. In FIG. 3, computer system 400 has at least one microprocessor or central processing unit (CPU) 405. CPU 405 is interconnected via a system bus 410 to a random access memory (RAM) 415, a read-only memory (ROM) 420, an input/output (I/O) adapter 425 for a connecting a removable data and/or program storage device 430 and a mass data and/or program storage device 435, a user interface adapter 440 for connecting a keyboard 445 and a mouse 450, a port adapter 455 for connecting a data port 460 and a display adapter 465 for connecting a display device 470.

ROM 420 contains the basic operating system for computer system 400. The operating system may alternatively reside in RAM 415 or elsewhere as is known in the art. Examples of removable data and/or program storage device 430 include magnetic media such as floppy drives and tape drives and optical media such as CD ROM drives. Examples of mass data and/or program storage device 435 include hard disk drives and non-volatile memory such as flash memory. In addition to keyboard 445 and mouse 450, other user input devices such as trackballs, writing tablets, pressure pads, microphones, light pens and position-sensing screen displays may be connected to user interface 440. Examples of display devices include cathode-ray tubes (CRT) and liquid crystal displays (LCD).

A computer program with an appropriate application interface may be created by one of skill in the art and stored on the system or a data and/or program storage device to simplify the practicing of this invention. In operation, information for or the computer program created to run the present invention is loaded on the appropriate removable data and/or program storage device 430, fed through data port 460 or typed in using keyboard 445.

The flow diagram depicted herein is just an example. There may be many variations to the diagram or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

The invention claimed is:

1. A method of assessing operational risk, the method comprising:
    defining a participant set that includes a plurality of members;
    identifying a set of initial risk sources;
    assigning risk certificates for each of the initial risk sources to each of the plurality of members of the participant set;
    defining vectors of metrics assigned to each of the initial risk sources;
    trading the risk certificates by a computer based interactive trading system among the plurality of members of the participant set; and
    establishing market prices that correspond to a level of risk associated with each of the initial risk sources.

2. The method of claim 1, further comprising: defining risk evaluation functions for each of the initial risk sources.

3. The method of claim 1, wherein trading the risk certificates includes buying certificates and selling certificates.

4. The method of claim 3, wherein buying certificates includes posting a buying interest to an interactive trading system.

5. The method of claim 3, wherein selling certificates includes posting a selling interest to an interactive trading system.

6. The method of claim 1, wherein trading the risk certificates includes direct negotiation between individual ones of the plurality of members of the participant set.

7. A system for assessing operational risk comprising:
    a central processing unit (CPU), said CPU being interconnected functionally via a system bus to:
    an input/output (I/O) adapter connecting to at least one of a removable data storage device, a program storage device, and a mass data storage device;
    a user interface adapter connecting to one or more computer input devices;
    a display adapter connecting to a display device; and
    at least one non-transitory memory device thereupon stored a set of instructions which, when executed by said CPU, causes said system to:
        receive a participant set including a plurality of members;
        request a list of initial risk sources;
        assign risk certificates to each of the plurality of members of the participant set;
        define vectors of metrics assigned to each of the initial risk sources;
        trade the risk certificates among the plurality of members of the participant set; and
        establish market prices that correspond to a level of risk associated with each of the initial risk sources.

8. The system according to claim 7, wherein the set of instructions which, when executed by said CPU, causes said system to: generate an ask table to facilitate buying certificates.

9. The system according to claim 7, wherein the set of instructions which, when executed by said CPU, causes said system to: generate a bid table to facilitate selling certificates.

10. The system according to claim 7, wherein the set of instructions which, when executed by said CPU, causes said system to: generate an information view, the information view including at least one of metrics used to calculate risk of the initial risk source, ownership of the initial risk source and number and price of certificates issued per initial risk source.

11. The system according to claim 7, wherein the set of instructions which, when executed by said CPU, causes said system to: generate an account view, the account view including at least one of an amount of available funds for buying new certificates for each of the plurality of members and a list of all certificates owned by each of the plurality of members.

12. The system according to claim 7, wherein the set of instructions which, when executed by said CPU, causes said system to: generate an analysis view, the analysis view listing current and historic market prices of all risk certificates.

13. The system according to claim 7, wherein the set of instructions which, when executed by said CPU, causes said system to: generate a trading view, the trading view including the environment for trading the certificates.

14. A computer program product comprising:
    a non-transitory computer useable medium including a computer readable program, wherein the computer readable program when executed on a computer causes the computer to:
    receive a participant set including a plurality of members;
    request a list of initial risk sources;
    assign risk certificates to each of the plurality of members of the participant set;
    define vectors of metrics assigned to each of the initial risk sources;
    trade the risk certificates among the plurality of members of the participant set; and establish market prices that correspond to a level of risk associated with each of the initial risk sources.

15. The computer program product according to claim 14, the computer readable program when executed on a computer causes the computer to: generate an ask table to facilitate buying certificates.

16. The computer program product according to claim 14, the computer readable program when executed on a computer causes the computer to: generate a bid table to facilitate selling certificates.

17. The computer program product according to claim 14, the computer readable program when executed on a computer causes the computer to: generate an information view, the information view including at least one of metrics used to calculate risk of the initial risk source, ownership of the initial risk source and number and price of certificates issued per initial risk source.

18. The computer program product according to claim 14, the computer readable program when executed on a computer causes the computer to: generate an account view, the account view including at least one of an amount of available funds for buying new certificates for each of the plurality of members and a list of all certificates owned by each of the plurality of members.

19. The computer program product according to claim 14, the computer readable program when executed on a computer causes the computer to: generate an analysis view, the analysis view listing current and historic market prices of all risk certificates.

* * * * *